(12) United States Patent
Park et al.

(10) Patent No.: US 9,500,779 B2
(45) Date of Patent: *Nov. 22, 2016

(54) POLARIZING PLATE

(71) Applicant: LG CHEM LTD., Seoul (KR)

(72) Inventors: Kwang-Seung Park, Daejeon (KR); Mi-Rin Lee, Daejeon (KR); Jun-Wuk Park, Daejeon (KR); Eun-Soo Huh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 14/389,236

(22) PCT Filed: Jun. 13, 2014

(86) PCT No.: PCT/KR2014/005229
§ 371 (c)(1),
(2) Date: Sep. 29, 2014

(87) PCT Pub. No.: WO2015/046713
PCT Pub. Date: Apr. 2, 2015

(65) Prior Publication Data
US 2016/0054480 A1 Feb. 25, 2016

(30) Foreign Application Priority Data

Sep. 30, 2013 (KR) .......... 10-2013-0116994
Jun. 3, 2014 (KR) .......... 10-2014-0067601

(51) Int. Cl.
| | | |
|---|---|---|
| C09K 19/00 | (2006.01) | |
| G02B 1/14 | (2015.01) | |
| G02B 5/30 | (2006.01) | |
| C09D 133/14 | (2006.01) | |
| G02B 1/04 | (2006.01) | |
| C08F 220/20 | (2006.01) | |

(52) U.S. Cl.
CPC ............. *G02B 1/14* (2015.01); *C08F 220/20* (2013.01); *C09D 133/14* (2013.01); *G02B 1/04* (2013.01); *G02B 5/305* (2013.01); *G02B 5/3025* (2013.01); *Y10T 428/10* (2015.01); *Y10T 428/1036* (2015.01); *Y10T 428/1041* (2015.01)

(58) Field of Classification Search
CPC ............. G02B 1/04; G02B 1/08; G02B 1/10; G02B 1/14; G02B 1/105; G02B 5/30; G02B 5/3033; G02B 5/3025; G02B 5/305; C09J 133/14; C09J 11/00; Y10T 428/10; Y10T 428/1036; Y10T 428/1041; Y10T 428/105
USPC ........ 428/1.1, 1.3, 1.31, 413, 480, 522, 523; 349/96; 359/507

See application file for complete search history.

(56) References Cited

U.S. PATENT DOCUMENTS

| | | |
|---|---|---|
| 2003/0134988 A1 | 7/2003 | Asano et al. |
| 2006/0066946 A1 | 3/2006 | Liu et al. |
| 2009/0275718 A1 | 11/2009 | Um et al. |
| 2013/0126085 A1 | 5/2013 | Suzuki et al. |
| 2014/0204317 A1 | 7/2014 | Huh et al. |

FOREIGN PATENT DOCUMENTS

| | | |
|---|---|---|
| CN | 100424526 C | 10/2008 |
| CN | 101907737 A | 12/2010 |
| JP | 2000-230016 A | 8/2000 |
| JP | 2001-151814 A | 6/2001 |
| JP | 2002-120326 A | 4/2002 |
| JP | 2005-97451 A | 4/2005 |
| JP | 2008-134384 A | 6/2008 |
| JP | 2008134384 A | 6/2008 |
| JP | 2010282161 A | * 12/2010 |
| KR | 10-2009-0115040 A | 11/2009 |
| KR | 10-2010-0138811 A | 12/2010 |
| KR | 10-2011-0014555 A | 2/2011 |
| TW | 201329532 A1 | 7/2013 |

* cited by examiner

*Primary Examiner* — Ruiyun Zhang
(74) *Attorney, Agent, or Firm* — Dentons US LLP

(57) ABSTRACT

There is provided a polarizing plate including a polarizer and a protective layer formed on at least one surface of the polarizer. The protective layer is formed of a cured product of a radically curable composition including: a first compound represented by Formula 1; a second compound including at least one carboxy group; and a radical initiator.

17 Claims, No Drawings

POLARIZING PLATE

This application is a National Stage application of PCT/KR2014/005229, filed on Jun. 13, 2014, which claims priority to Korean Patent Application Nos. 10-2013-0116994, filed on Sep. 30, 2013, and 10-2014-0067601 filed on Jun. 3, 2014, all of which are hereby incorporated by reference in their entirety.

TECHNICAL FIELD

The present disclosure relates to a polarizing plate, and more particularly, to a polarizing plate including a radically cured protective layer on a surface of a polarizer.

BACKGROUND ART

Polarizing plates used in the related have a stacked structure in which protective films are attached to both surfaces of a polarizer formed of a polyvinyl alcohol (hereinafter, referred to as 'PVA')-based resin generally dyed with a dichroic dye or iodine, using an adhesive. However, in order to reduce the thickness of polarizing plates in line with the recent trend for reducing the size of display devices, single-sided polarizing plates, in which a protective film is only provided on one surface of a polarizer and a bonding layer is directly formed on the other surface of the polarizer without a protective film, have been developed. In the case of such single-sided polarizing plates in which a bonding layer is directly formed on a polarizer, however, polarizers may be easily cracked in severe conditions due to poor durability, and curling caused due to a difference in shrinkage rates between a protective film and a bonding layer may lead to light leakage in the case that single-sided polarizing plates are disposed in display devices.

To address these problems, techniques for forming a protective layer between a polarizer and a bonding layer by using a curable resin have been proposed. Korean Patent Application Laid-open Publication No.: 2011-0014555 discloses a polarizing plate including a protective layer formed between a polarizer and a bonding layer and having a tensile modulus of 100 MPa or above. In the disclosed polarizing plate, however, an epoxy-based resin or a hydroxyethyl acrylate-based resin used as a protective layer former has poor water resistance and a low glass transition temperature, and thus the durability and optical characteristics of the polarizing plate may be deteriorated in high-humidity, high-temperature environments.

RELATED ART DOCUMENT

Patent Document (Patent Document 1) Korean Patent Application Laid-open Publication No.: 2011-0014555

DISCLOSURE

Technical Problem

An aspect of the present disclosure may provide a polarizing plate having a reduced thickness and superior characteristics even in high-humidity, high-temperature environments.

Technical Solution

According to an aspect of the present disclosure, a polarizing plate may include: a polarizer and a protective layer formed on at least one surface of the polarizer, wherein the protective layer may be formed of a cured product of a radically curable composition including: a first compound represented by the following Formula 1; a second compound including at least one carboxy group; and a radical initiator,

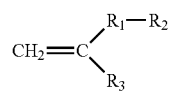

[Formula 1]

where $R_1$ may be an ester group or an ether group, $R_2$ may be a $C_{1-10}$ alkyl group including at least one hydroxy substituent or a $C_{4-20}$ cycloalkyl group including at least one hydroxy substituent, and $R_3$ may be hydrogen or a $C_{1-10}$ alkyl group.

The radically curable composition may include 20 to 90 parts by weight of the first compound, 5 to 50 parts by weight of the second compound, and 0.5 to 10 parts by weight of the radical initiator, for every 100 parts by weight the radically curable composition.

The radically curable composition may further include, as a third compound, an acrylic monomer having a ring structure with a carbon number of 7 to 20. For example, the radically curable composition may further include, as a third compound, an acrylic monomer having a ring structure with a carbon number of 7 to 15. In this case, the radically curable composition may include 20 to 90 parts by weight of the first compound, 5 to 50 parts by weight of the second compound, 1 to 50 parts by weight of the third compound, and 0.5 to 10 parts by weight of the radical initiator, for every 100 parts by weight the radically curable composition.

For example, the first compound may include at least one selected from the group consisting of compounds represented by the following Formulas 2 to 11:

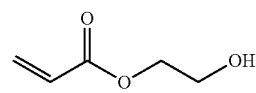

[Formula 2]

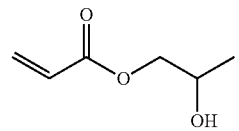

[Formula 3]

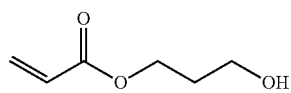

[Formula 4]

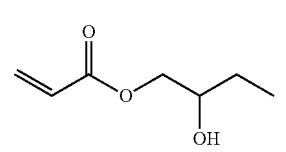

[Formula 5]

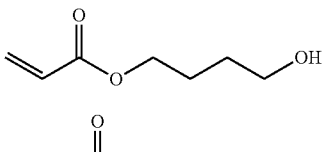

[Formula 6]

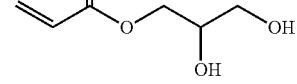

[Formula 7]

[Formula 8]
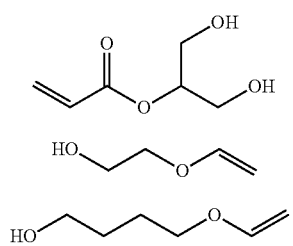
[Formula 9]
HO~~~O~~~
[Formula 10]
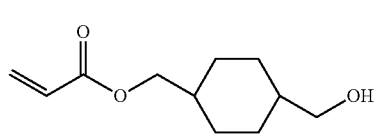
[Formula 11]
For example, the second compound may include at least one selected from the group consisting of compounds represented by the following Formulas 12 to 26:
[Formula 12]
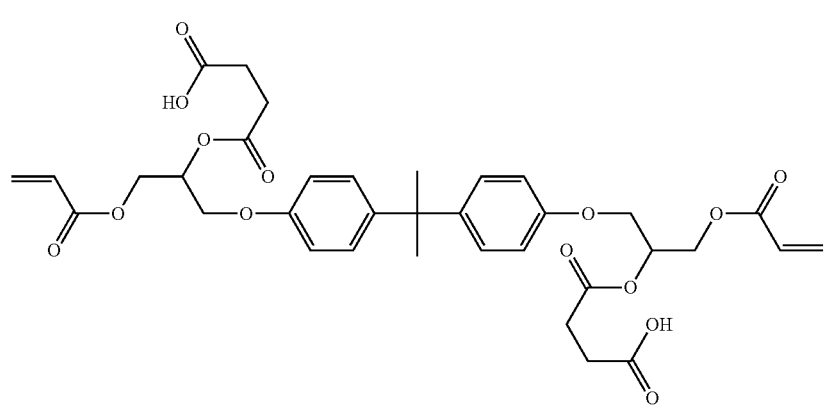
[Formula 13]
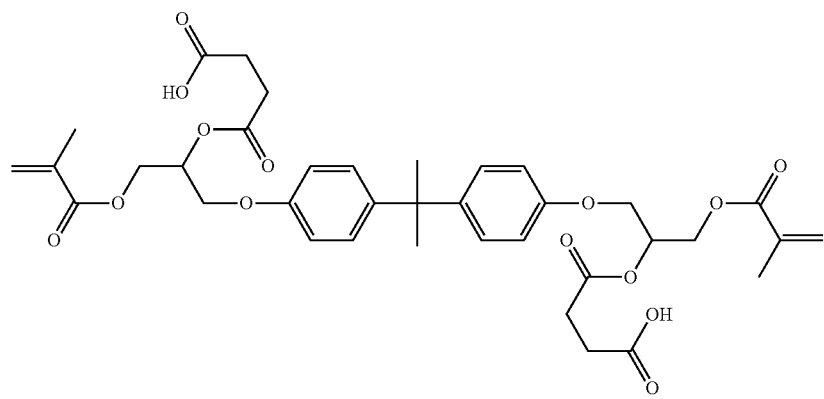
[Formula 14]
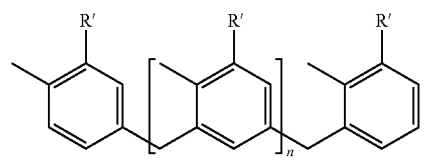

where R' is
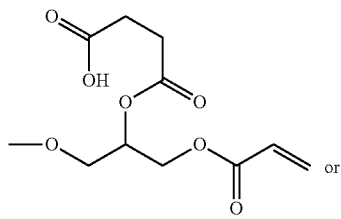 or
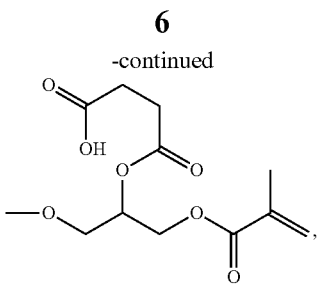
and n is an integer ranging from 1 to 5
[Formula 15]
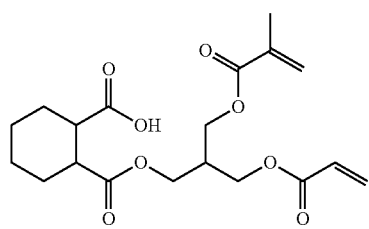
[Formula 16]
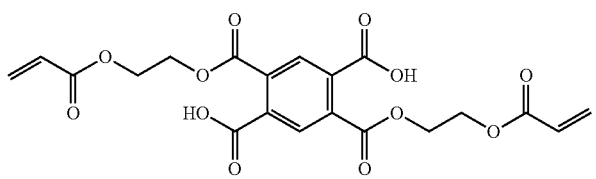
[Formula 17]
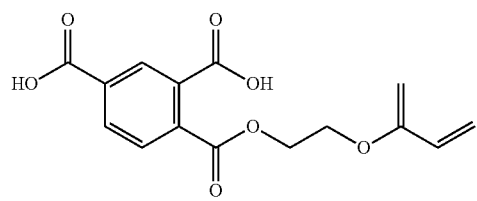
[Formula 18]
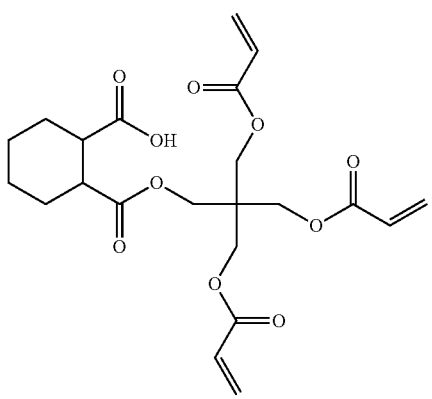
[Formula 19]
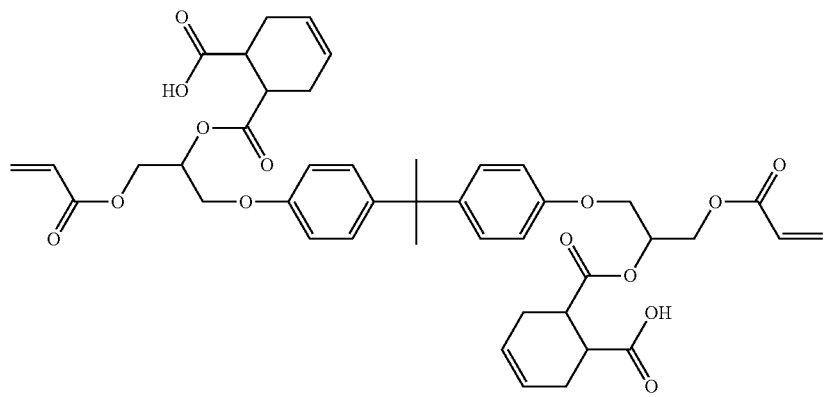
[Formula 20]
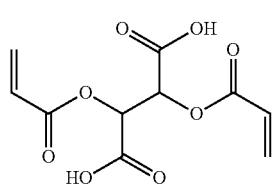
[Formula 21]
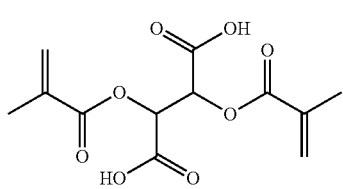

-continued

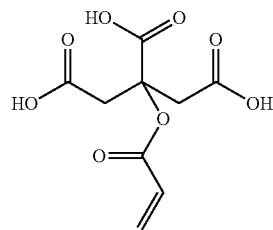
[Formula 22]

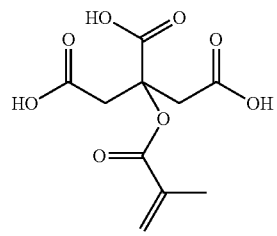
[Formula 23]

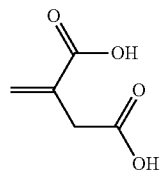
[Formula 24]

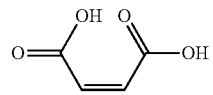
[Formula 25]

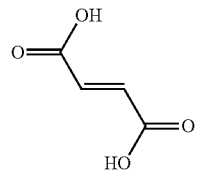
[Formula 26]

The second compound may have an acidity of about 100 to about 1,000 KOH mg/g.

For example, the third compound may include at least one selected from the group consisting of isobornyl(meth)acrylate, norbornyl(meth)acrylate, dicyclopentanyl(meth)acrylate, dicyclopentenyl(meth)acrylate), and 1-adamantyl(meth)acrylate).

If necessary, the radically curable composition may further include a cationic initiator, and in this case, the cationic initiator may be included in an amount of about 0.1 to about 10 parts by weight for every 100 parts by weight of the radically curable composition.

For example, the cationic initiator may include at least one selected from the group consisting of hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium)dihexafluoroantimonate, and (thiodi-4,1-phenylene)bis(diphenylsulfonium)dihexafluorophosphate.

The radically curable composition may have an acidity of about 30 to about 300 mg KOH/g. For example, the radically curable composition may have a viscosity of about 10 to about 300 cP. The radically curable composition may have a glass transition temperature of about 70° C. or higher after being cured.

A protective film may be attached, by an adhesive layer, to a surface of the polarizer opposite the surface of the polarizer on which the positive electrode layer is formed. In this case, the protective film may be any protective film generally used in the related art, such as a cellulosic film, an acrylic film, a cycloolefin film, or a polyethylene terephthalate film.

The polarizing plate may further include a bonding layer on top of the protective layer for attachment to a display panel or an optical film.

According to another aspect of the present disclosure, a display device may include the polarizing plate.

Advantageous Effects

The polarizing plate of the present disclosure includes the thin protective layer formed on at least one surface of the polarizer to replace a protective film, and thus, the polarizing plate has a reduced thickness and is relatively lightweight as compared with polarizing plates of the related art.

Furthermore, in the present disclosure, the radically curable composition used to form the protective layer has a high glass transition temperature and high water resistance, and thus the polarizing plate including the protective layer formed of the radically curable composition has high durability and superior optical characteristics even in high-temperature, high-humidity environments.

BEST MODE

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The inventors have repeatedly conducted research into developing a thin polarizing plate having high durability even in high-temperature and high-humidity environments, and highly reliable heat resistance. As a result, the inventors have found that the objects as described above could be achieved by preparing a resin composition in which certain kinds of compounds are mixed and forming a protective layer on at least one surface of a polarizer by curing the resin composition. Based on this knowledge, the inventors have invented the present invention.

In detail, a polarizing plate of the present disclosure includes a polarizer and a protective layer formed on at least one surface of the polarizer, wherein the protective layer is formed of a cured product of a radically curable composition including: a first compound represented by the following Formula 1; a second compound including at least one carboxy group; and a radical initiator,

[Formula 1]

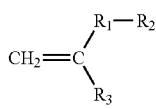

where $R_1$ is an ester group or an ether group, $R_2$ is a $C_{1-10}$ alkyl group or $C_{4-10}$ cycloalkyl group including at least one hydroxy substituent, and $R_3$ is hydrogen or a $C_{1-10}$ alkyl group. In $R_2$, the alkyl group may be a linear or a branched alkyl group, and the hydroxy substituent may be located in an arbitrary position of the alkyl group or the cycloalkyl group. For example, the hydroxy substituent may be located on an end of the alkyl group or in the middle of the alkyl group.

In this case, the first compound functions as an adhesive ingredient enabling the protective layer to adhere to the polarizer, and various compounds represented by Formula 1 may be used as the first compound. In the present disclosure, for example, the first compound may include at least one compound selected from compounds represented by the following Formulas 2 to 11, or may be prepared by mixing at least two selected from the compounds represented by the following Formulas 2 to 11. However, the first compound is not limited thereto. If the first compound is prepared by mixing at least two compounds, the first compound may be prepared by mixing at least one selected from the compounds represented by Formulas 9 and with at least one selected from the compounds represented by Formulas 2 to 8 and 11.

[Formula 2]

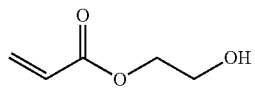

[Formula 3]

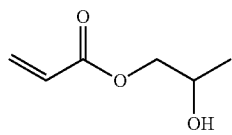

[Formula 4]

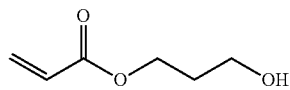

[Formula 5]

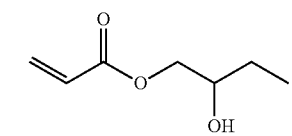

[Formula 6]

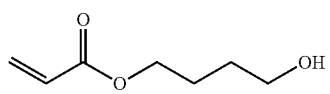

-continued

[Formula 7]

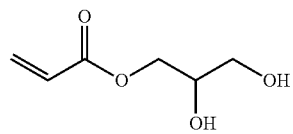

[Formula 8]

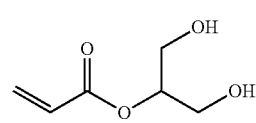

[Formula 9]

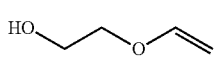

[Formula 10]

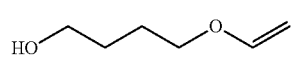

[Formula 11]

The content of the first compound may range from 20 parts by weight to 90 parts by weight, from 40 parts by weight to 80 parts by weight, or from 50 parts by weight to 70 parts by weight, for every 100 parts by weight of the radically curable composition. If the content of the first compound is within the above-mentioned range, the bonding strength between the polarizer and the protective layer may be stably maintained even in high-temperature, high-humidity conditions.

The second compound improves heat resistance and viscosity characteristics of the protective layer and includes at least one carboxy group. In detail, for example, the second compound may include at least one selected from compounds represented by the following Formulas 12 to 26, or may be prepared by mixing at least two selected from the compounds represented by the following Formulas 12 to 26. If the second compound is prepared by mixing at least two compounds, the second compound may be prepared by mixing at least one selected from the compounds represented by Formulas 12 to 14 with at least one selected from the compounds represented by Formulas 20 to 26.

[Formula 12]
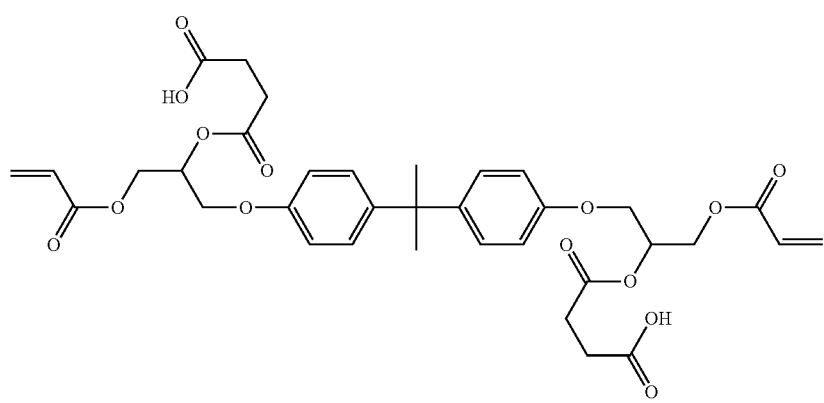
[Formula 13]
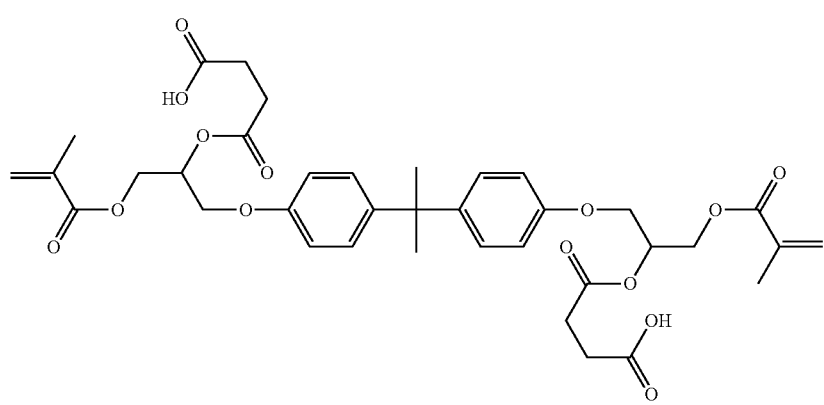
[Formula 14]
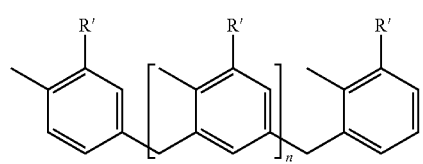
where R' is
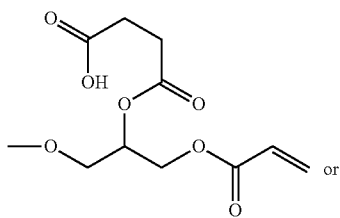 or
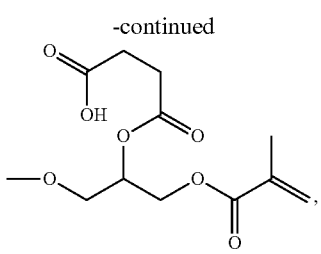
n is an integer ranging from 1 to 5
[Formula 15]
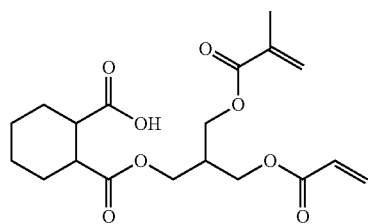
[Formula 16]
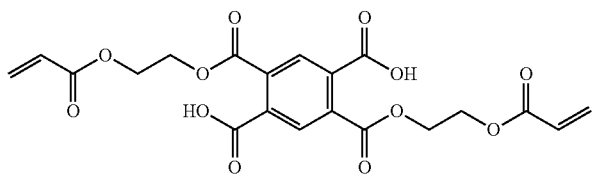

[Formula 17]
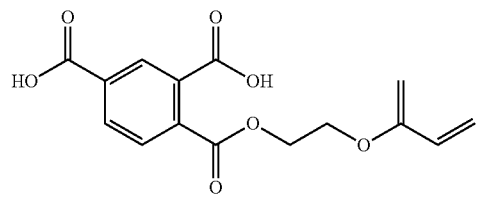
[Formula 18]
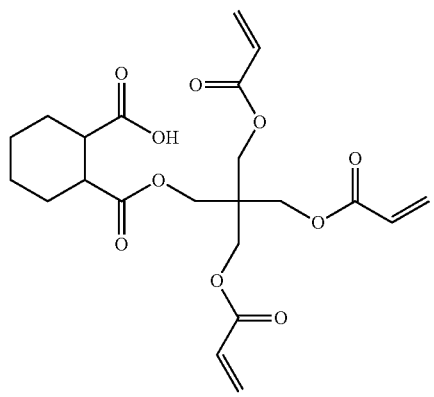
[Formula 19]
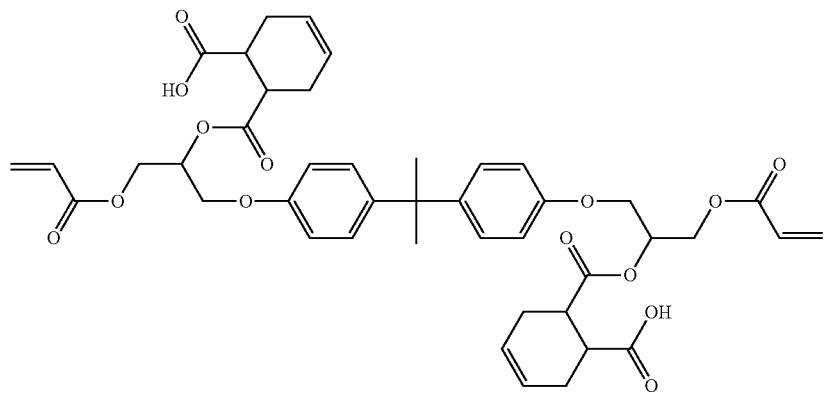
[Formula 20]
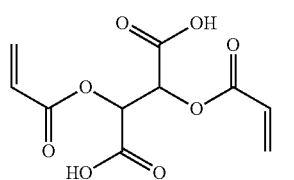
[Formula 21]
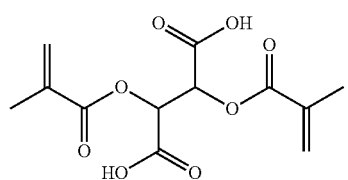
[Formula 22]
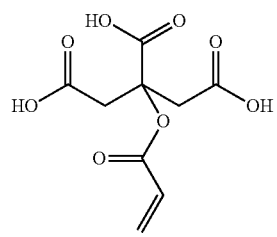
[Formula 23]
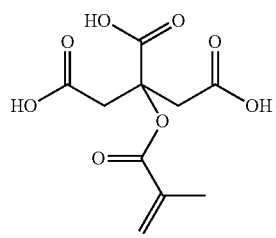
[Formula 24]
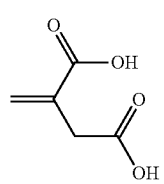
[Formula 25]
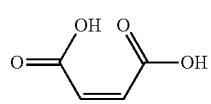
[Formula 26]
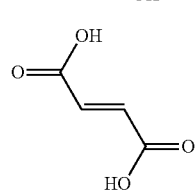

Preferably, the second compound may have an acidity of 100 to 1,000 mg KOH/g. For example, the second compound may have an acidity of about 100 to about 300 mg KOH/g or about 300 to about 900 mg KOH/g. If the acidity of the second compound is within this range, the radically curable composition may have an increased glass transition temperature without a decrease in adhesiveness to the polarizer, and thus the protective layer may have high heat resistance. Herein, the acidity refers to the amount of KOH in milligrams (mg) necessary to fully neutralize 1 g of a sample.

In addition, it may be preferable that the second compound be a homopolymer having a glass transition temperature of 60° C. or higher. If the radically curable composition includes only the first compound, although the radically curable composition has high adhesiveness, the heat resistance thereof may be low due to a low glass transition temperature. However, if the radically curable composition includes the first compound and the second compound having a glass transition temperature of 60° C. or higher, the heat resistance and water resistance of the protective layer may be further improved.

Preferably, the content of the second compound may range from about 5 parts by weight to about 50 parts by weight for every 100 parts by weight of the radically curable composition. For example, the content of the second compound may range from about 15 parts by weight to about 50 parts by weight or from about 20 parts by weight to about 40 parts by weight, for every 100 parts by weight of the radically curable composition. If the content of the second compound is within the above-mentioned range, the protective layer may have high adhesiveness with respect to the polarizer and high heat resistance as well.

In addition, the radically curable composition of the present disclosure may further include, as a third compound, an acrylic monomer having a ring structure with a carbon number of 7 to 20, preferably, 7 to 15.

For example, specifically, third compound may include at least one selected from the group consisting of isobornyl (meth)acrylate, norbornyl(meth)acrylate, dicyclopentanyl (meth)acrylate, dicyclopentenyl(meth)acrylate), and 1-adamantyl-(meth)acrylate). However, the third compound is not limited thereto.

The content of the third compound may be 50 parts by weight or less for every 100 parts by weight of the radically curable composition. For example, it may be preferable that the content of the third compound range from 1 part by weight to 50 parts by weight, from 5 parts by weight to 50 parts by weight, or from 10 parts by weight to 50 parts by weight, for every 100 parts by weight of the radically curable composition. If the content of the third compound is within the above-mentioned range, the viscosity of the radically curable composition may be improved, and the glass transition temperature of the radically curable composition may be improved after curing.

In the present disclosure, specifically, it may be preferable that the radically curable composition include 20 to 90 parts by weight of the first compound, 5 to 50 parts by weight of the second compound, 1 to 50 parts by weight of the third compound, and 0.5 to 10 parts by weight of the radical initiator, for every 100 parts by weight of the radically curable composition. More preferably, the radically curable composition may include 40 to 80 parts by weight of the first compound, 15 to 50 parts by weight of the second compound, 1 to 50 parts by weight of the third compound, and 0.5 to 10 parts by weight of the radical initiator, for every 100 parts by weight of the radically curable composition.

In the present disclosure, the radical initiator is included in the radically curable composition to facilitate radical polymerization and thus to increase the rate of cure. The radical initiator may be any material generally used as a radical initiator in the related art. For example, the radical initiator may include at least one selected from the group consisting of 1-Hydroxy-cyclohexyl-phenyl-ketone, 2-hydroxy-2-methyl-1-phenyl-1-propanone, 2-Hydroxy-1-[4-(2-hydroxyethoxy)phenyl]-2-methyl-1-propanone, methylbenzoylformate, oxy-phenyl-acetic acid-2-[2 oxo-2phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-Benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, and phenyl bis(2,4,6-trimethyl benzoyl)phosphine oxide. In the present disclosure, particularly, the radical initiator may include at least one of phosphine oxide and phenyl bis(2,4,6-trimethyl benzoyl).

Preferably, the content of the radical initiator may range from 0.5 parts by weight to 10 parts by weight, from 1 part by weight to 5 parts by weight, or from 2 parts by weight to 3 parts by weight, for every 100 parts by weight of the radically curable composition. If the content of the radical initiator is within the above range, the protective layer may be easily cured.

In the present disclosure, if necessary, the radically curable composition may further include a cationic initiator.

Since the cationic initiator generates acid ($H^+$) when exposed to active energy rays, the acidity of the radically curable composition may be controlled using the cationic initiator so as to improve the adhesiveness of the radically curable composition with respect to the polarizer. For example, the cationic initiator may include a sulfonium salt or an iodonium salt.

In detail, the cationic initiator including the sulfonium salt or the iodonium salt may include at least one selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-Iodonium hexafluorophosphate, (Thiodi-4,1-phenylene)bis(diphenylsulfonium)dihexafluoroantimonate, and (Thiodi-4,1-phenylene)bis(diphenylsulfonium)dihexafluorophosphate. However, the cationic initiator is not limited thereto.

The content of the cationic initiator may be 10 parts by weight or less for every 100 parts by weight of the radically curable composition. Preferably, the content of the cationic initiator may range from 0.1 parts by weight to 10 parts by weight, from 1 part by weight to 6 parts by weight, or 3 parts by weight to 5 parts by weight, for every 100 parts by weight of the radically curable composition. In the present disclosure, if the content of the cationic initiator in the radically curable composition is within the above-mentioned range, the adhesiveness of the radically curable composition with respect to the polarizer may be improved as compared with the case in which the radically curable composition does not include the cationic initiator or the content of the cationic initiator is outside of the above-mentioned range.

In the present disclosure, for example, the acidity of the radically curable composition may range from 30 to 300 mg KOH/g, from 30 to 100 mg KOH/g, or from 100 to 300 mg KOH/g. If the acidity of the radically curable composition is within the range, the bonding strength between the radically curable composition and the polarizer may be maintained at a high level, and the glass transition temperature of the radically curable composition may be increased to improve heat-resistance characteristics of the polarizing plate.

Preferably, the radically curable composition of the present disclosure may have a glass transition temperature within the range of about 70° C. to about 500° C. after being cured. For example, the radically curable composition may have a glass transition temperature within the range of 80° C. to 300° C. or 90° C. to 200° C. If the polarizing plate is manufactured using the radically curable composition having a glass transition temperature within the above-mentioned range, the polarizing plate may have high heat resistance and water resistance.

In addition, preferably, the radically curable composition of the present disclosure may have a viscosity within the range of about 10 cP to about 300 cP or about 20 cP to about 100 cP. If the radically curable composition has viscosity within the range, the protective layer may be formed to have a reduced thickness, and processability may be improved owing to low viscosity.

If the protective layer is formed of the radically curable composition of the present disclosure, the protective layer may have high water resistance, and thus even though the polarizing plate is exposed to high temperature and high humidity conditions, the polarizer may be less damaged and may maintain its superior optical characteristics. Since the radically curable composition of the present disclosure has a high curing rate and a high curing degree, the productivity of a polarizing plate manufacturing process may be improved.

The polarizing plate of the present disclosure may be manufactured by applying the radically curable composition to at least one surface of the polarizer and curing the radically curable composition to form the protective layer. In this case, the application of the radically curable composition may be performed using an application method well known in the related art, such as spin coating, bar coating, or roll coating. In addition, the curing may be performed by using active energy rays such as ultraviolet rays or electron beams.

The polarizer is not limited to a particular type. A polarizer well known in the related art, such as a polyvinyl alcohol (PVA) film including an iodine or dichroic die, may be used as the polarizer. The polarizer may be formed by dyeing a PVA film with an iodine or dichroic die. However, the polarizer is not limited thereto.

If necessary, the polarizing plate may further include a protective film attached to one surface of the polarizer using an adhesive layer. In this case, the protective film may be attached to a surface of the polarizer on which the protective layer is not formed. However, the protective film is not limited thereto.

The adhesive layer may be formed of an adhesive well known in the related art as an adhesive for a polarizing plate, such as a polyvinyl alcohol-based adhesive, an acrylic adhesive, an epoxy-based adhesive, or a urethane-based adhesive. In detail, after applying such an adhesive to one surface of the polarizer or the protective film, the polarizer and the protective film may be brought into contact with each other, and the adhesive may be cured with heat or active energy rays, so as to attach the protective film to the polarizer.

The protective film may be a protective film formed of a material generally known in the related art. Non-limiting examples of the protective film include cellulosic films, polyethylene terephthalate (PET) films, cycloolefin polymer films, and acrylic films. An acrylic film may be used as the protective film in terms of optical characteristics, durability, and economic factors.

In this case, the acrylic protective film may include a (meth)acrylate-based resin. For example, a film including a (meth)acrylate-based resin may be obtained by extruding a film formation material including a (meth)acrylate-based resin as a main ingredient.

The acrylic protective film may include a copolymer having an alkyl(meth)acrylate unit and a styrene unit, and an aromatic resin having a carbonate moiety in the main chain. Alternatively, the acrylic protective film may include an alkyl(meth)acrylate unit, a styrene unit, a 3- to 6-membered heterocyclic unit substituted with at least one carbonyl group, and a vinyl cyanide unit.

Alternatively, the acrylic protective film may include a (meth)acrylate-based resin having an aromatic ring. As an example of the (meth)acrylate-based resin having an aromatic ring, a resin composition is disclosed in Korean Patent Application Laid-open Publication No.: 10-2009-0115040. The disclosed resin composition includes: (a) a (meth)acrylate unit including at least one (meth)acrylate derivative; (b) an aromatic unit including a chain having a hydroxyl-containing moiety and an aromatic moiety; and (c) a styrene unit including at least one styrene derivative. The units (a) to (c) may be included in the resin composition as separate copolymers, or two or more of the units (a) to (c) may be included in the resin composition as a copolymer.

Alternatively, the acrylic protective film may include an acrylic resin having a lactone ring structure. Examples of a (meth)acrylate-based resin having a lactone ring structure are disclosed in Japanese Patent Application Laid-open Publication Nos. 2000-230016, 2001-151814, and 2002-120326.

The acrylic protective film may be formed by any method. For example, materials such as a (meth)acrylate-based resin, a polymer, and an additive may be fully mixed by an appropriate method to form a thermoplastic resin composition, and a film may be formed of the thermoplastic resin composition. In another example, solutions such as a (meth)acrylate-based resin solution, a polymer solution, and an additive solution may be individually prepared and mixed with each other to obtain a uniform solution mixture, and a film may be formed using the uniform solution mixture.

The thermoplastic resin composition may be obtained by: pre-blending the above-described raw materials using an appropriate mixer such as an omni-mixer; and kneading and extruding the mixture. The mixture may be kneaded and extruded by any mixer. For example, an extruder such as a uniaxial extruder or a biaxial extruder, or a pressure kneader may be used.

In the above, an appropriate film forming method such as a solution casting method, a melting extrusion method, a calendaring method, or a compressing method may be used. For example, the solution casting method or the melting extrusion method may be used.

Examples of a solvent that may be used in the solution casting method include: aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride;

dimethylformamide; and dimethyl sulfoxide. The listed solvents may used individually or in combination.

The solution casting method may be performed by using a device such as a drum casting machine, a band casting machine, or a spin coater. Examples of the melting extrusion method may include a T-die method and an inflation method. Such a film formation method may preferably be performed at 150° C. to 350° C., more preferably at 200° C. to 300° C.

In the case of forming a film using the T-die method, a T-die may be disposed on a leading end of a well-known uniaxial or biaxial extruder, and an extruded film may be rolled into a roll. In this case, the temperature of a roll may be properly controlled so that the film may be stretched (oriented) in an extrusion direction (uniaxial stretching). In addition, simultaneous or sequential orientation may be performed by simultaneously or sequentially orienting the film in a direction perpendicular to the extrusion direction.

The acrylic protective film may be a non-stretched (non-oriented) film or an oriented film. In the latter case, the acrylic protective film may be a uniaxially oriented film or a biaxially oriented film. If the acrylic protective film is a biaxially oriented film, the acrylic protective film may a simultaneously biaxially oriented film or a sequentially biaxially oriented film. If the acrylic protective film is a biaxially oriented film, the quality of the acrylic protective film may be improved owing to improved mechanical strength. If the acrylic protective film includes a thermoplastic resin, although the acrylic protective film is oriented, the phase difference of the acrylic protective film may not be increased, and the optical isotropy of the acrylic protective film may be maintained.

The acrylic protective film may be oriented at a temperature around the glass transition temperature of the thermoplastic resin composition, preferably at a temperature of (glass transition temperature−30° C.) to (glass transition temperature+100° C.), more preferably at a temperature of (glass transition temperature−20° C.) to (glass transition temperature+80° C.). If the orientation temperature is lower than (glass transition temperature −30° C.), a sufficient orientation ratio may not be obtained. On the other hand, if the orientation temperature is higher than (glass transition temperature+100° C.), the thermoplastic resin composition may flow, and thus orientation may not be stably performed.

An area orientation ratio of the acrylic protective film may preferably be within the range of 1.1 to 25, more preferably within 1.3 to 10. If the area orientation ratio is lower than 1.1, although the acrylic protective film is oriented, the toughness of the acrylic protective film may not be improved. If the area orientation ratio is higher than 25, orientation effects may not be further obtained.

An orientation rate may be preferably within 10%/min to 20,000%/min, more preferably within 100%/min to 10,000%/min. If the orientation rate is lower than %/min, it may take a long period of time to obtain a sufficient orientation ratio, and thus, manufacturing costs may be increased. If the orientation rate is higher than 20,000%/min, the acrylic protective film may be fractured during orientation.

After the acrylic protective film is oriented, the acrylic protective film may be heat-treated (annealed) for stabilizing optical isotropic and mechanical characteristics thereof. Conditions for the heat treatment are not limited. For example, the heat treatment may be performed in proper conditions known in the related art.

In addition, the acrylic protective film may be surface-treated for improving adhesiveness. For example, at least one selected from the group consisting of alkali treatments, corona treatments, and plasma treatments may be performed on at least one surface of the optical film.

If necessary, the polarizing plate of the present disclosure may include a bonding layer formed on top of the protective layer for attachment to a display panel or an optical film such as a retardation film.

In this case, the bonding layer may be formed of a bonding agent known in the related art. The kind of the bonding agent is not limited to a particular type. For example, the bonding layer may be formed of a rubber-based bonding agent, an acrylic bonding agent, a silicone-based bonding agent, a urethane-based bonding agent, a polyvinyl alcohol-based bonding agent, a polyvinylpyrrolidone-based bonding agent, a polyacrylamide-based bonding agent, a cellulosic bonding agent, or a vinyl alkyl ether-based bonding agent. An acrylic bonding agent may be used to form the bonding layer in terms of transparency and heat resistance.

The bonding layer may be formed by applying such a bonding agent to an upper surface of the protective layer, or a bonding sheet formed by applying such a bonding agent to a release film and drying the bonding agent may be attached to the upper surface of the protective layer to form the bonding layer.

The polarizing plate of the present disclosure may be usefully used in an optical device such as a liquid crystal display. For example, the optical device may be an liquid crystal display including an liquid crystal panel and polarizing plates disposed on both sides of the liquid crystal panel, and at least one of the polarizing plates may be the polarizing plate of the present disclosure. In this case, the liquid crystal panel is not limited to a particular type thereof. Examples of the liquid crystal panel include: passive matrix panels such as twisted nematic (TN) panels, super twisted nematic (STN) panels, ferroelectric (F) panels, or polymer dispersed (PD) panels; active matrix panels such as two terminal panels or three terminal panels; in-plane switching (IPS) panels; and vertical alignment (VA) panels. However, the liquid crystal panel is not limited to such well-known panels. In addition, other structures of the liquid crystal display, such as upper and lower substrates (e.g., color filter substrates or array substrates), are not limited. For example, the other structures of the liquid crystal panel may be structures well known in the related art.

MODE FOR INVENTION

Hereinafter, embodiments of the present disclosure will be described in detail through examples.

Example 1

Composition A for Forming a Protective Layer

Composition A for forming a protective layer was prepared by mixing 67 parts by weight of 2-hydroxyethyl acrylate (Formula 2), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Example 2

Composition B for Forming a Protective Layer

Composition B for forming a protective layer was prepared by mixing 67 parts by weight of 4-hydroxybutyl acrylate (Formula 6), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Example 3

Composition C for Forming a Protective Layer

Composition C for forming a protective layer was prepared by mixing 67 parts by weight of hydroxyisopropyl acrylate (Formula 3), 20 parts by weight of carboxylated BPA type dimethacrylate (Formula 13), 10 parts by weight of itaconic acid (Formula 24), and 3 parts by weight of Irgacure 819 (radical initiator), and agitating the mixture at 60° C. for 4 hours.

Example 4

Composition D for Forming a Protective Layer

Composition D for forming a protective layer was prepared by mixing 67 parts by weight of 4-hydroxymethylcyclohexyl methacrylate (Formula 11), 20 parts by weight of carboxylated BPA dimethacrylate (Formula 13), 10 parts by weight of itaconic acid (Formula 24), and 3 parts by weight of Irgacure 819 (radical initiator), and agitating the mixture at 60° C. for 4 hours.

Example 5

Composition E for Forming a Protective Layer

Composition E for forming a protective layer was prepared by mixing 67 parts by weight of 2-hydroxyethyl acrylate (Formula 2), 30 parts by weight of 2,5-bis((2-(acryloyloxy)ethoxy)carbonyl)terephthalic acid (Formula 16), 10 parts by weight of itaconic acid (Formula 24), and 3 parts by weight of Irgacure 819 (radical initiator), and agitating the mixture at 60° C. for 4 hours.

Example 6

Composition F for Forming a Protective Layer

Composition F for forming a protective layer was prepared by mixing 67 parts by weight of 2-hydroxyethyl acrylate (Formula 2), 30 parts by weight of 4-((2-(acryloyloxy)ethoxy)carbonyl)isophthalic acid (Formula 17), 10 parts by weight of itaconic acid (Formula 24), and 3 parts by weight of Irgacure 819 (radical initiator), and agitating the mixture at 60° C. for 4 hours.

Example 7

Composition G for Forming a Protective Layer

Composition G for forming a protective layer was prepared by: putting together 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) together with 100 parts by weight of the resins; and agitating the mixture at 60° C. for 4 hours.

Example 8

Composition H for Forming a Protective Layer

Composition H for forming a protective layer was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Example 9

Composition I for Forming a Protective Layer

Composition I for forming a protective layer was prepared by: putting together 60 parts by weight of 4-hydroxybutyl acrylate (Formula 6), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) together with 100 parts by weight of the resins; and agitating the mixture at 60° C. for 4 hours.

Example 10

Composition J for Forming a Protective Layer

Composition J for forming a protective layer was prepared by: putting together 60 parts by weight of 4-hydroxybutyl acrylate (Formula 6), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Example 11

Composition K for Forming a Protective Layer

Composition K for forming a protective layer was prepared by: putting together 60 parts by weight of 2-hydroxypropyl acrylate (Formula 4), 4.3 parts by weight of ethylene glycol monovinyl ether (Formula 9), 5.7 parts by weight of maleic acid (Formula 25), and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) together with 100 parts by weight of the resins; and agitating the mixture at 60° C. for 4 hours.

Example 12

Adhesive Composition L

Composition L for forming a protective layer was prepared by: putting together 60 parts by weight of 2-hydroxypropyl acrylate (Formula 4), 4.3 parts by weight of ethylene glycol monovinyl ether (Formula 9), 5.7 parts by weight of maleic acid (Formula 25), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Example 13

Composition M for Forming a Protective Layer

Composition M for forming a protective layer was prepared by: putting together 60 parts by weight of 2-hydroxyethyl acrylate (Formula 2), 4.3 parts by weight of ethylene glycol monovinyl ether (Formula 9), 5.7 parts by weight of fumaric acid (Formula 26), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing parts by weight of phenylbis(2,4,6-trimethylbensoyl)-phosphine oxide (radical initiator) together with 100 parts by weight of the resins; and agitating the mixture at 60° C. for 4 hours.

Example 14

Composition N for Forming a Protective Layer

Composition N for forming a protective layer was prepared by: mixing 60 parts by weight of 2-hydroxyethyl acrylate (Formula 2), 4.3 parts by weight of ethylene glycol monovinyl ether (Formula 9), 5.7 parts by weight of fumaric acid (Formula 26), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture 60° C. for 4 hours.

Example 15

Composition O for Forming a Protective Layer

Composition O for forming a protective layer was prepared by: mixing 60 parts by weight of 2-hydroxyethyl acrylate (Formula 2), 5 parts by weight of 1,4-butanolvinylether (Formula 10), 5 parts by weight of maleic acid (Formula 25), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) together with 100 parts by weight of the resins; and agitating the mixture at 60° C. for 4 hours.

Example 16

Composition P for Forming a Protective Layer

Composition P for forming a protective layer was prepared by: mixing 60 parts by weight of 2-hydroxyethyl acrylate (Formula 2), 5 parts by weight of 1,4-butanolvinylether (Formula 10), 5 parts by weight of maleic acid (Formula 25), and 30 parts by weight of 4,4'-(((propane-2,2-diylbis(4,1-phenylene))bis(oxy))bis(1-(methacryloyloxy)propane-3,2-diyl))bis(oxy))bis(4-oxobutanoic acid) (Formula 12); mixing 3 parts by weight of phenylbis(2,4,6-trimethylbensoyl)-phosphine oxide (radical initiator) and 5 parts by weight of diphenyl(4-phenylthio)phenylsulfonium hexafluorophosphate (cationic initiator) together with 100 parts by weight of the resins; and agitating the mixture at 60° C. for 4 hours.

Example 17

Composition Q for Forming a Protective Layer

Composition Q for forming a protective layer was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 6,6'-((((propane-2,2-diylbis(4,1-phenylene))bis(oxy))bis(1-acryloyloxy)propane-3,2-diyl))bis(oxy))bis(carbonyl))bis(cyclohex-3-enecarboxylic acid) (Formula 19); mixing 3 parts by weight of phenylbis(2,4,6-trimethylbensoyl)-phosphine oxide (radical initiator) together with 100 parts by weight of the resins; and agitating the mixture 60° C. for 4 hours.

Example 18

Composition R for Forming a Protective Layer

Composition R for forming a protective layer was prepared by: mixing 60 parts by weight of 2-hydroxyethyl acrylate (Formula 2), 4.3 parts by weight of ethylene glycol monovinyl ether (Formula 9), 5.7 parts by weight of maleic acid (Formula 25), and 30 parts by weight of 6,6'-((((propane-2,2-diylbis(4,1-phenylene))bis(oxy))bis(1-acryloyloxy)propane-3,2-diyl))bis(oxy))bis(carbonyl))bis(cyclohex-3-enecarboxylic acid) (Formula 19); mixing 3 parts by weight of phenylbis(2,4,6-trimethylbensoyl)-phosphine oxide (radical initiator) and 5 parts by weight of diphenyl (4-phenylthio)phenylsulfonium hexafluorophosphate (cationic initiator) together with 100 parts by weight of the resins; and agitating the mixture 60° C. for 4 hours.

Comparative Example 1

Composition S for Forming a Protective Layer

Composition S for forming a protective layer was prepared by mixing 67 parts by weight of 2-hydroxyethyl acrylate (Formula 2), 30 parts by weight of tris(2-hydroxyethyl)isocyanurate triacrylate, and 3 parts by weight of Irgacure 819 (radical initiator), and agitating the mixture at 60° C. for 4 hours.

Comparative Example 2

Composition T for Forming a Protective Layer

Composition T for forming a protective layer was prepared by mixing 67 parts by weight of 2-hydroxyethyl acrylate (Formula 2), 30 parts by weight of dipropylene glycol diacrylate, and 3 parts by weight of Irgacure 819 (radical initiator), and agitating the mixture at 60° C. for 4 hours.

Experimental Example 1

Adhesiveness Test

Radically curable compositions A to T prepared in Examples 1 to 18 and Comparative Examples 1 and 2 were respectively applied to PVA devices, and the PVA devices were stacked and passed through a laminator. Thereafter, the PVA devices were irradiated with ultraviolet rays at an intensity of 900 mJ/cm$^2$ by using an UV radiation device. In this way, samples were made. The samples were cut into 20 mm in width and 100 mm in length, and maintained at a temperature of 20° C. at 70% relative humidity for four days, and stripping forces were measured while stripping the PVA devices at a speed of 300 mm/min to an angle of 90 degrees. Measurement results are shown in Table 1 below, in which a stripping force of 3.0 N/cm or greater is denoted as exceptional, 2.0 N/cm to less than 3.0 N/cm as excellent, 1.0 N/cm to less than 2.0 N/cm as good, 0.5 N/cm to less than 1.0 N/cm as poor, and less than 0.5 N/cm as very poor.

TABLE 1

| NO. | Adhesive Compositions | Adhesiveness |
|---|---|---|
| Example 1 | A | Excellent |
| Example 2 | B | Good |
| Example 3 | C | Good |
| Example 4 | D | Good |
| Example 5 | E | Good |
| Example 6 | F | Excellent |
| Example 7 | G | Exceptional |
| Example 8 | H | Excellent |
| Example 9 | I | Excellent |
| Example 10 | J | Excellent |
| Example 11 | K | Excellent |
| Example 12 | L | Excellent |
| Example 13 | M | Good |
| Example 14 | N | Good |
| Example 15 | O | Good |
| Example 16 | P | Good |
| Example 17 | Q | Good |
| Example 18 | R | Good |
| Comparative Example 1 | S | Poor |
| Comparative Example 2 | T | Poor |

While exemplary embodiments have been shown and described above, it will be apparent to those skilled in the art that modifications and variations could be made without departing from the spirit and scope of the present disclosure as defined by the appended claims.

The invention claimed is:

1. A polarizing plate comprising a polarizer and a protective layer formed on at least one surface of the polarizer, wherein the protective layer is formed of a cured product of a radically curable composition comprising:
   a first compound represented by the following Formula 1;
   a second compound comprising at least one carboxyl group; and
   a radical initiator,

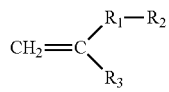

[Formula 1]

where $R_1$ is an ester group or an ether group,
$R_2$ is a $C_{1-10}$ alkyl group comprising at least one hydroxy substituent or a $C_{4-10}$ cycloalkyl group comprising at least one hydroxy substituent, and
$R_3$ is hydrogen or a $C_{1-10}$ alkyl group, and
wherein the second compound comprises at least one selected from the group consisting of compounds represented by the following Formulas 12 to 26:

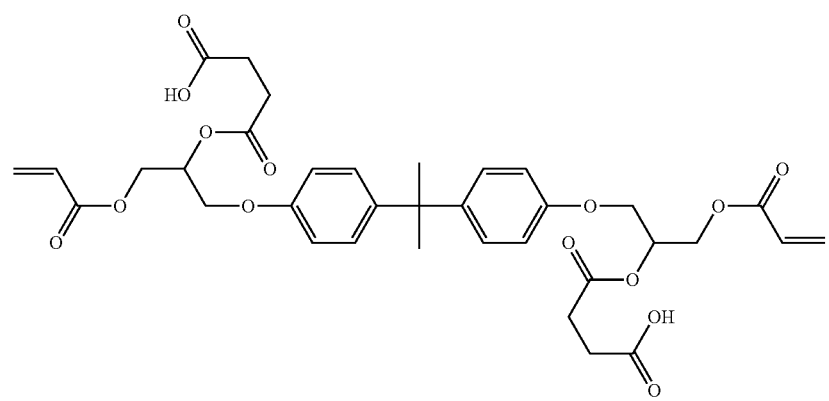

[Formula 12]

[Formula 13]
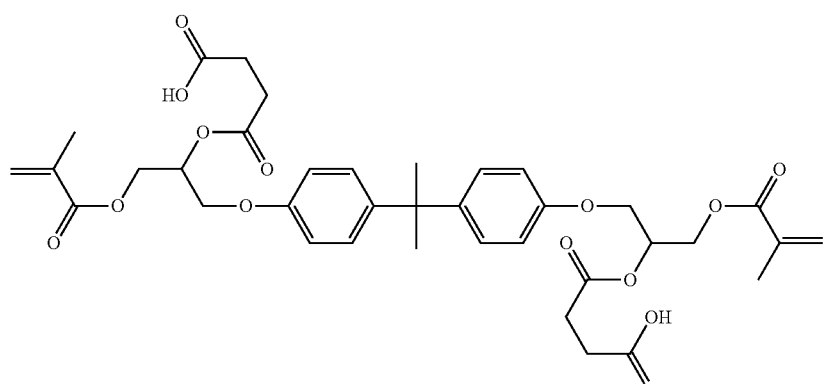
[Formula 14]
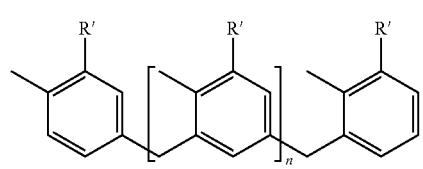
where R' is
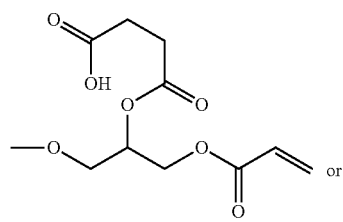 or
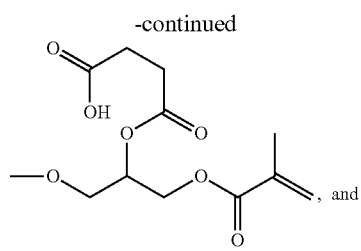, and
n is an integer ranging from 1 to 5
[Formula 15]
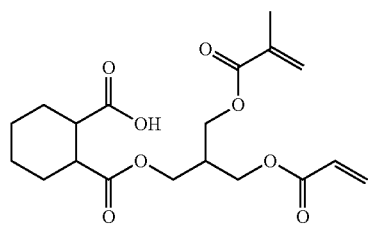
[Formula 16]
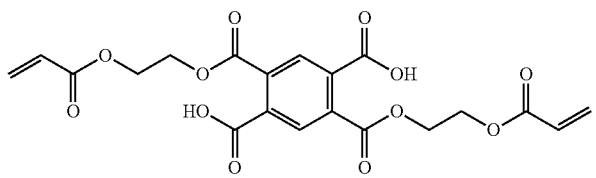
[Formula 17]
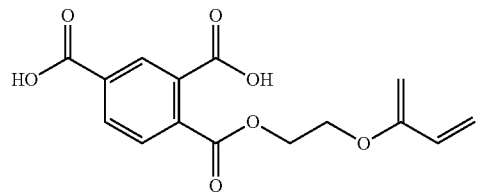
[Formula 18]
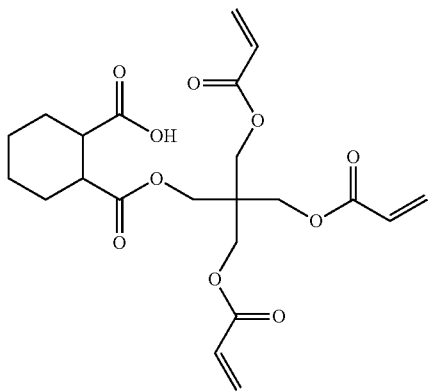

-continued

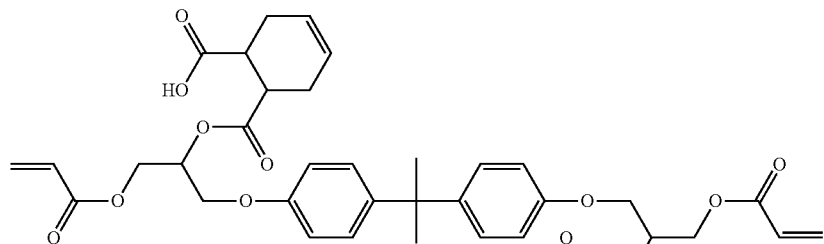
[Formula 19]

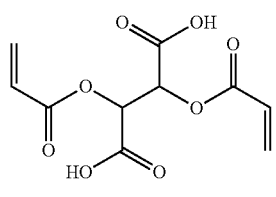
[Formula 20]

[Formula 21]

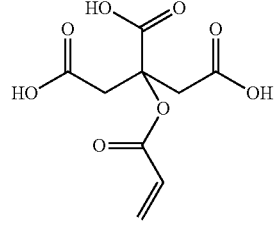
[Formula 22]

[Formula 23]

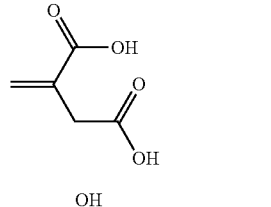
[Formula 24]

[Formula 25]

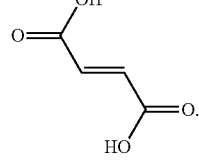

[Formula 26]

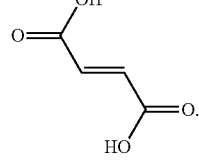

2. The polarizing plate of claim 1, wherein the radically curable composition comprises 20 to 90 parts by weight of the first compound, 5 to 50 parts by weight of the second compound, and 0.5 to 10 parts by weight of the radical initiator, for every 100 parts by weight the radically curable composition.

3. The polarizing plate of claim 1, wherein the radically curable composition further comprises, as a third compound, an acrylic monomer having a ring structure with a carbon number of 7 to 20.

4. The polarizing plate of claim 3, wherein the radically curable composition comprises 20 to 90 parts by weight of the first compound, 5 to 50 parts by weight of the second compound, 1 to 50 parts by weight of the third compound, and 0.5 to 10 parts by weight of the radical initiator, for every 100 parts by weight the radically curable composition.

5. The polarizing plate of claim 1, wherein the first compound comprises at least one selected from the group consisting of compounds represented by the following Formulas 2 to 11:

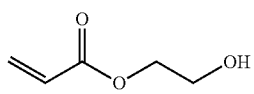
[Formula 2]

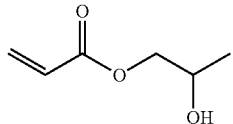
[Formula 3]

-continued

[Formula 4]
[Formula 5]
[Formula 6]
[Formula 7]
[Formula 8]
[Formula 9]
[Formula 10]
[Formula 11]

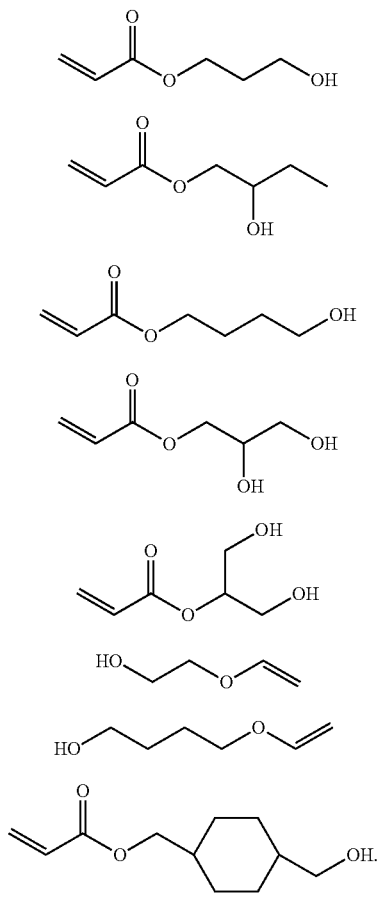

6. The polarizing plate of claim 1, wherein the second compound has an acidity of 100 to 1,000 KOH mg/g.

7. The polarizing plate of claim 3, wherein the third compound comprises at least one selected from the group consisting of isobornyl (meth)acrylate, norbornyl (meth) acrylate, dicyclopentanyl (meth)acrylate, dicyclopentenyl (meth)acrylate), and 1-adamantyl-(meth)acrylate).

8. The polarizing plate of claim 1, wherein the radically curable composition further comprises a cationic initiator.

9. The polarizing plate of claim 8, wherein the cationic initiator is included in an amount of 0.1 to 10 parts by weight for every 100 parts by weight of the radically curable composition.

10. The polarizing plate of claim 8, wherein the cationic initiator comprises at least one selected from the group consisting of hexafluoroantimonate, diphenyl(4-phenylthio) phenylsulfonium hexafluorophosphate, (phenyl)[4-(2-methylpropyl) phenyl]-iodonium hexafluorophosphate, (thiodi-4, 1-phenylene)bis(diphenylsulfonium) dihexafluoroantimonate, and (thiodi-4,1-phenylene)bis(diphenylsulfonium)dihexafluorophosphate.

11. The polarizing plate of claim 1, wherein the radically curable composition has an acidity of 30 to 300 mg KOH/g.

12. The polarizing plate of claim 1, wherein the cured product of the radically curable composition has a glass transition temperature of 70° C. or higher.

13. The polarizing plate of claim 1, wherein the radically curable composition has a viscosity of 10 to 300 cP.

14. The polarizing plate of claim 1, wherein a protective film is attached, by an adhesive layer, to a surface of the polarizer opposite the surface of the polarizer on which the protective layer is formed.

15. The polarizing plate of claim 14, wherein the protective film is a cellulosic film, a polyethylene terephthalate (PET) film, a cycloolefin polymer (COP) film, or an acrylic film.

16. The polarizing plate of claim 1, further comprising a bonding layer on top of the protective layer.

17. A display device comprising the polarizing plate of claim 1.

* * * * *